Sept. 26, 1961        F. E. DUFFY ET AL        3,001,435
MUSIC TRANSPOSITION AND CHORD CONSTRUCTION DEVICE
Filed Nov. 18, 1959        3 Sheets-Sheet 1
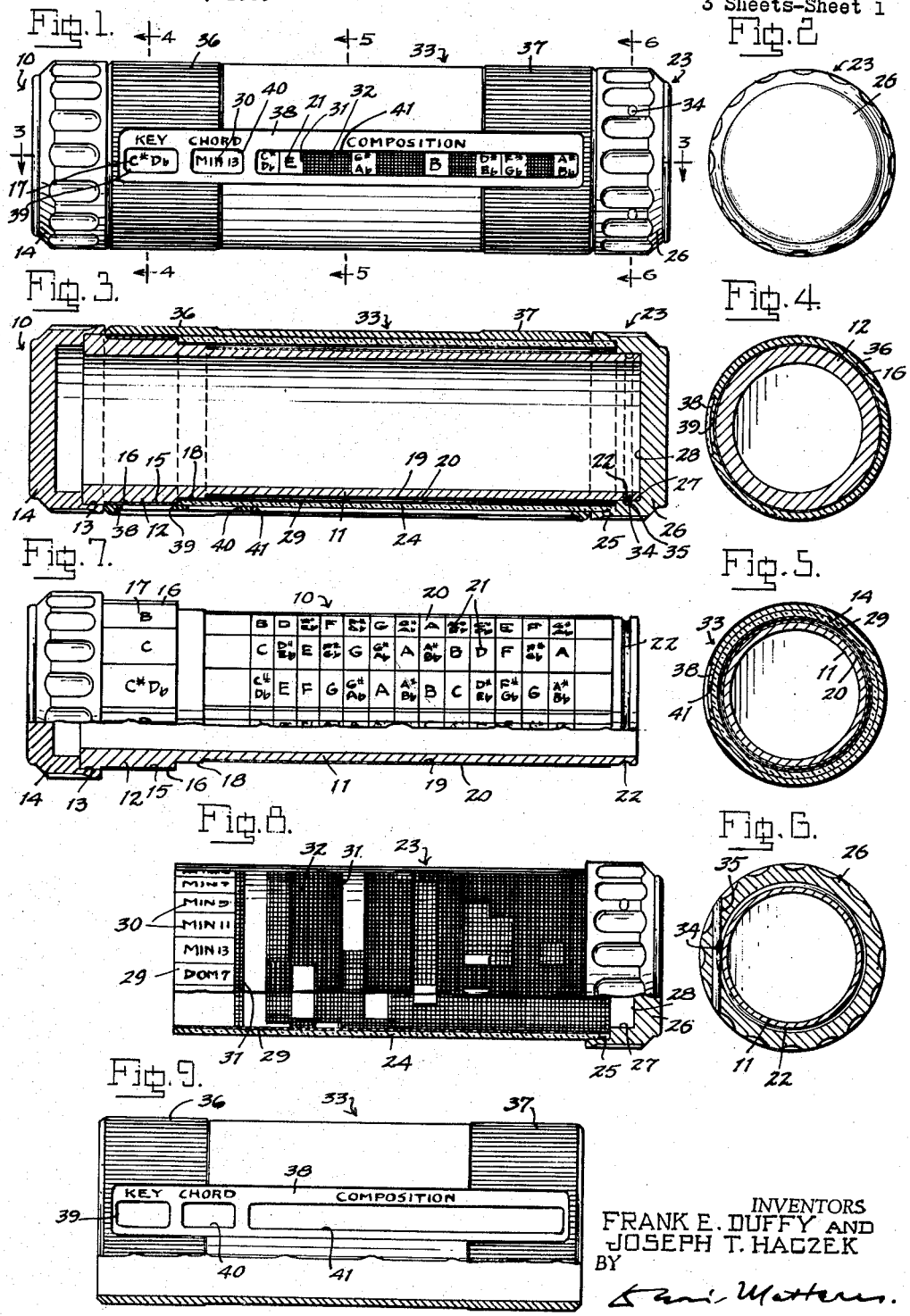
INVENTORS
FRANK E. DUFFY AND
JOSEPH T. HACZEK
BY
ATTORNEY

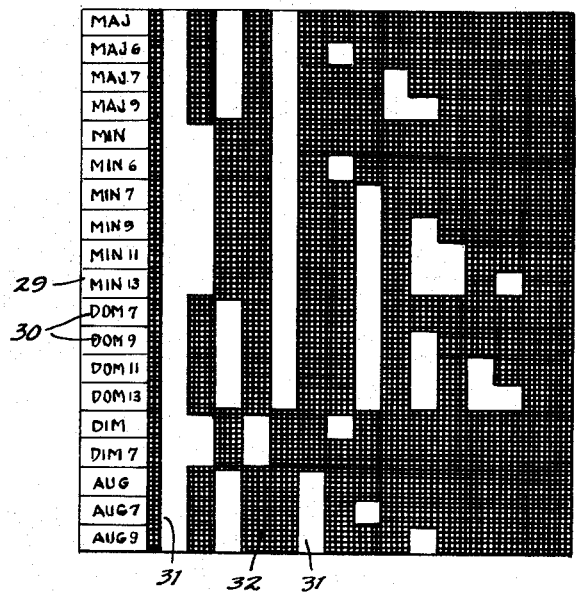

Sept. 26, 1961    F. E. DUFFY ET AL    3,001,435
MUSIC TRANSPOSITION AND CHORD CONSTRUCTION DEVICE
Filed Nov. 18, 1959    3 Sheets-Sheet 3
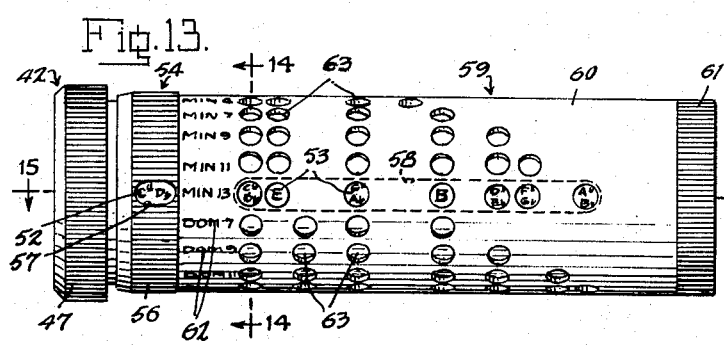
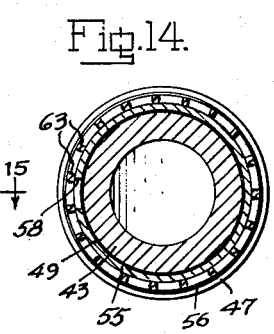
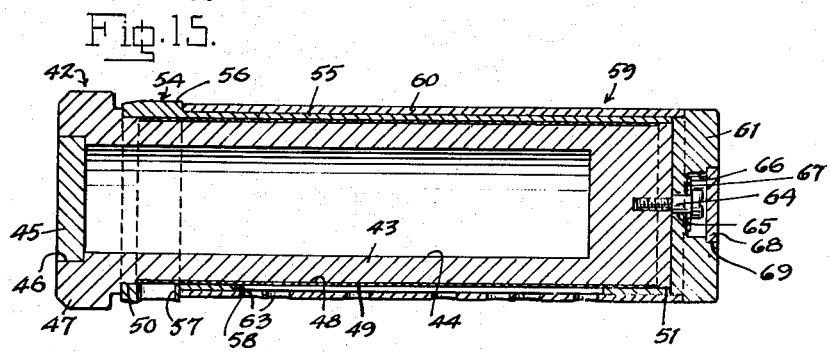
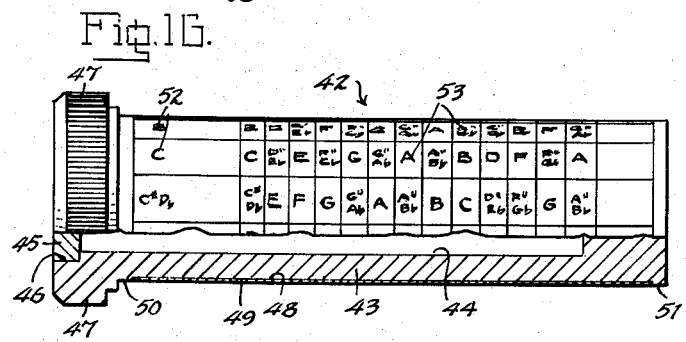
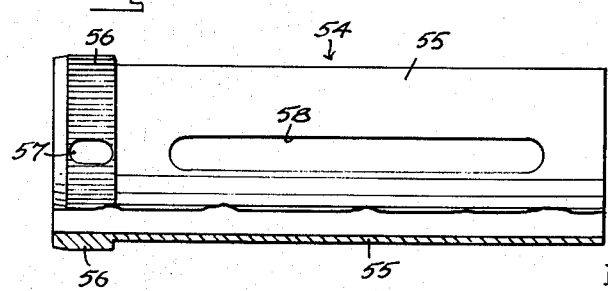
INVENTORS
FRANK E. DUFFY AND
JOSEPH T. HACZEK
BY
ATTORNEY.

__United States Patent Office__

3,001,435
Patented Sept. 26, 1961

3,001,435
MUSIC TRANSPOSITION AND CHORD
CONSTRUCTION DEVICE
Frank E. Duffy, Highland Mills, N.Y. (10601 Vose St., Reseda, Calif.), and Joseph Thomas Haczek, 5 Gennis Drive, Rochester, N.Y.
Filed Nov. 18, 1959, Ser. No. 853,908
4 Claims. (Cl. 84—474)

The present invention relates to a music transposition and chord construction device, and has for an object to provide a device of this character of simple construction and operation by means of which a person, with no more knowledge of music than an understanding of the notes in one octave, may construct any chord in any key.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of a music transposition and chord construction device according to the invention, the same being shown with its parts and their relative position to indicate a minor 13 chord in the key of C-sharp, D-flat;

FIG. 2 is an end view of the device as seen from the right in FIG. 1;

FIG. 3 is a longitudinal sectional view taken along the line of 3—3 of FIG. 1;

FIG. 4 is a transverse sectional view taken along the line of 4—4 of FIG. 1;

FIG. 5 is a transverse sectional view taken along the line of 5—5 of FIG. 1;

FIG. 6 is a transverse sectional view taken along the line of 6—6 of FIG. 1;

FIG. 7 is a view partially in side elevation and partially in longitudinal section of the key signature and chromatic scale containing element of the device;

FIG. 8 is a view partially in side elevation and partially in longitudinal section of the chord determining element of the device;

FIG. 9 is a view partially in side elevation and partially in longitudinal section of the coordinating key signature and chord designating element of the device;

FIG. 10 is a plan view in flattened form of the key signature designation decalcomania strip for attachment to the key signature and chromatic scale containing element of the device as seen in FIG. 7;

FIG. 11 is a plan view in flattened form of the chromatic scale containing decalcomania sheet for attachment to the key signature and chromatic scale containing element of the device as seen in FIG. 7;

FIG. 12 is a plan view in flattened form of the chord designating decalcomania sheet for attachment to the chord determining element as seen in FIG. 8;

FIG. 13 is a side elevation of a modified form of the invention;

FIG. 14 is a transverse sectional view taken along the line of 14—14 of FIG. 13;

FIG. 15 is a longitudinal sectional view taken along the line of 15—15 of FIG. 13;

FIG. 16 is a view partially in side elevation and partially in longitudinal section of the key signature and chromatic scale containing element of the modified form of the device illustrated in FIGS. 13-15;

FIG. 17 is a view partially in side elevation and partially in longitudinal section of the coordinating key signature and chord designating element of the modified form of the device as shown in FIGS. 13-15;

Referring to the drawings, and more particularly to FIGS. 1 through 12, the music transposition and chord construction device according to the embodiment of the invention illustrated therein comprises a key signature and chromatic scale containing element 10, shown in detail in FIG. 7, consisting of a cylindrical tubular member 11 provided at one end with a cylindrical portion 12 secured at its outer end portion by cementing within the shouldered annular recess 13 of a manipulating knob 14. At its external surface the portion 12 extending outside the knob is slightly recessed as at 15 to receive a decalcomania strip 16, shown in its flat form in FIG. 10, and upon which there is contained a series of key signature designations 17, these key signature designations being twelve in number. The key signature designations represent a working or abbreviated chromatic scale wherein certain of the notes of a full or true chromatic scale have been selectively deleted for the purpose of compactness and simplicity in the general field of use for which the device is intended, it being pointed out that the device may if desired contain key signature designations representing a full or true chromatic scale.

Adjacent the inner end of the portion 12 there is provided for a purpose that will presently more fully appear a stepped down annular bearing portion 18, and, extending from the bearing portion 18 to the end of the element 10 opposite from the knob 14, there is provided a slightly stepped down cylindrical surface 19 upon which there is secured a chromatic scale containing decalcomania sheet 20, shown in flat form in FIG. 11, which contains note designations 21 arranged in twelve longitudinal lines in longitudinal line with the key signature designations 17, and arranged in a longitudinally extending series of circumferential bands, thirteen in number as illustrated, the first band containing the notes of the chromatic scale corresponding to the key signature designations 17, while the other bands each contain the notes of the chromatic scale in selectively staggered relation. Like the key signature designations these scales are also abbreviated with some of the notes of the full or true chromatic scale deleted.

At the marginal end portion of the element 10 opposite the knob 14 and beyond the edge of the sheet 20 there is provided a circumferential groove 22 for the purpose of interlocking the element 10 with the other elements of the device, as will hereinafter more fully appear.

The chord determining element 23 shown in detail in FIG. 8 comprises a cylindrical tubular member 24 formed of transparent material, preferably a transparent plastic material, having its end portion opposite the knob carrying end of the element 10 secured as by cementing within an annular shouldered recess 25 of a manipulating knob 26, this knob preferably being identical with the knob 14, for the purpose of simplicity and symmetry in design. The length of the cylindrical tubular member 24 is such that when it is assembled upon the element 10 with its end portion in rotatable bearing engagement with the bearing band 18, the end portion of the element 10 provided with the annular groove 22 is in rotatable bearing engagement with the annular bearing wall 27 of a recessed pocket 28 provided in the knob 26. Upon the interior of the member 24 there is secured a decalcomania sheet 29, shown in flat form in FIG. 12, and which contains in its left hand margin a series of chord designations 30, these being nineteen in number and representing a series of chords to be constructed in relation to the key signature designations. The body portion of the sheet 29 is provided with a series of clear slot openings 31 of varying circumferential lengths and aligned with the circumferential bands of the chromatic scale containing sheet 20 carried by the element 10. The remaining surface of the sheet 29 is opaque, for instance black as at 32, so that in its superimposed relation to the element 10 certain of the longitudinally aligned note designations of the chord of a selected key signature are exposed through the clear slot openings 31 while the other longitudinally aligned notes are cancelled or blocked out.

A coordinating key signature and chord designating cylindrical element 33 is engaged for free rotation about the assembled elements 10 and 23, as shown in FIG. 3, with its ends in adjacent substantially butted relation with the inner edges of the manipulating knobs 14 and 26, the assembled elements being retained in their relative rotatable relation by means of a locking pin 34 engaged through a hole 35 in the knob 26 disposed tangentially across the annular wall 27 of the recessed pocket 28, so that the pin extends tangentially across and within the annular groove 22 of the element 10 to thus retain the elements against longitudinal displacement while permitting of their free relative rotation.

The element 10 is adapted to be relatively rotated by turning the knob 14 while the elements 23 and 33 are held stationary, and the element 23 is adapted to be relatively rotated by turning the knob 26 while the elements 10 and 33 are held stationary, the element 33 being adapted to be held against rotation with respect to either one of the elements 10 and 23 while the other of these elements is rotated. For this purpose suitably knurled annular surfaces 36 and 37 are provided adjacent the ends of the element 33, so that the fingers of the hand engaged with the knob 14, for instance, may at the same time grip the knurled surface 36, to hold the elements 10 and 33 against relative rotation, while the element 23 is rotated by turning the knob 26 with the other hand. Similarly the fingers of the hand engaged with the knob 26 may at the same time grip the knurled surface 37 to hold the elements 33 and 23 against relative rotation, while the element 10 is rotated by turning the knob 14 with the other hand.

In a longitudinally extending panel recess 38 in the outer surface of the element 33 there are provided in longitudinal alignment a sight opening 39 designated "Key" for register with one of the key signature designations 17 of the element 10 and through which a selected key signature designation is visible, a sight opening 40 designated "Chord" for register with one of the chord designations 30 of the element 23 and through which a selected chord designation is visible, and an elongated sight opening 41 designated "Composition" for register with one longitudinal series of the chromatic scale note designations 21 of the element 10 and through which the notes of a selected chord exposed through the clear slot openings 31 of the element 23 are visible.

In FIGS. 13 through 17 there is illustrated a modified form of the device, wherein the chord determining element is disposed exteriorly, and the coordinating key signature and chord designating element is interposed between the chord determining element and the key signature and chromatic scale containing element. The key signature and chromatic scale containing element 42, shown in detail in FIG. 16, comprises a cylindrical member 43 provided with a cylindrical bore 44 extending inwardly from its outer end and having a closure disk 45 secured as by cementing within an annular recess 46, provided in the outer end of the bore 44. An enlarged diameter knurled knob portion 47 is provided at the outer end of the member 43, and within the outer surface of the member 43 between the knob and its opposite end there is provided an elongated annular recess 48 in which there is secured a decalcomania sheet 49, annular bearing surfaces 50 and 51 being provided at the respective ends of the recess 48. The decalcomania sheet contains key signature designations 52 in its left hand marginal portion representing the notes of an abbreviated chromatic scale, and note designations 53 arranged in longitudinal series in line with the key signature designations 52 and in a longitudinally extending series of circumferential bands, the arrangement being identical with the key signature and note designations of the decalcomania strip 16 and sheet 20 of the embodiment of the invention illustrated in FIGS. 1–12.

The coordinating key signature and note designating element 54, shown in detail in FIG. 17, comprises a tubular cylindrical member 55 provided at its left hand end, i.e., the end corresponding to the knob end of the element 42, with an enlarged diameter knurled knob portion 56. The overall length of the element 54 corresponds to the length of the cylindrical portion of the element 42 between its knob end 47 and its opposite end, and its internal diameter corresponds substantially to the diameter of the annular bearing portions 50 and 51 of the element 42, so that in the assembled relation, as shown in FIG. 15, the element 54 is rotatably engaged about the element 42 with the knob portion 56 in adjacent substantially butted relation to the knob portion 47. In the knob portion 56 there is provided a sight opening 57 for register with the key signature designations 52 of the element 42 through which a selected key signature designation is visible, and in longitudinal line with the sight opening 57 there is provided in the body portion of the element 54 an elongated sight opening 58 for register with a selected longitudinal series of the chromatic scale note designations 53 of the element 42.

The chord determining element 59 comprises a cylindrical tubular member 60 having an internal diameter for rotatable engagement with the cylindrical member 55 of the element 54 and an outside diameter slightly less than the diameter of the knob portion 56 of the element 54. A closure disk 61 is secured as by cementing in the outer end of the tubular member 60, and in the assembled relation substantially abuts the ends of the elements 42 and 54, with the opposite end of the tubular member 60 in substantially butted relation with the inner edge of the knob portion 56 of the element 54. In the annular marginal portion of the element 59 adjacent its left hand end there are provided, as by engraving, printing, molding, or the like, chord designations 62 arranged in an annular series in substantially identical manner to the chord designations 30 of the embodiment of the invention illustrated in FIGS. 1–12. In the body of the member 60 there are provided a plurality of sight holes 63 arranged in a series of annular bands and in longitudinal alignment with the chord designations 62, these sight holes being in substantially corresponding arrangement to the clear slot openings 31 of the embodiment of the invention illustrated in FIGS. 1–12, and serving the same function of exposing notes of a selected chord, the solid portions of the member 60 in the longitudinal spaces between the sight holes cancelling or blocking out the other notes of the series in corresponding manner to the opaque portions 32 of said embodiment.

The assembled elements are connected in relative rotatable relation and held against longitudinal displacement by means of a screw stud 64 screwed into the center of the element 42 and engaged through a center hole 65 in the closure end 61 of the element 59, the head of the stud being disposed within a pocket 66 provided in the closure end 61, with a spacer washer 67 arranged between the head and the base of the pocket. The pocket is preferably closed by means of a closure disk 68 cemented in place within an annular recess 69 in the wall of the pocket.

In the operation of the device the three elements are freely rotatable with respect to each other. The arrangement of the knob portions 47 and 56 is such that the fingers of the hand engaged with the knob 47 may also grip the knob portion 56 to hold the elements 42 and 54 against relative rotation while the element 59 is rotated with the other hand. Also, the elements 54 and 59 may be held against relative rotation by the fingers of the hand engaged with the knob portion 56 also gripping the end of the element 59, while the knob portion 47 is engaged by the other hand to rotate the element 42 relatively to the elements 54 and 59. Thus, any desired chord of a selected key signature may be determined by bringing the sight opening 57 of the element 54 into register with the desired key signature designation, and thereupon rotating the element 59 to bring the desired chord designation into line with the key signature designation exposed through the sight opening 57, the notes of the chord being thereupon exposed through the sight holes 63 in longitudinal line with the key signature designation exposed in the sight opening 57.

What is claimed is:

1. In a music transposition and chord construction device, a first element comprising a cylindrical member having adjacent one end a circumferential series of key signature note designations representing selected notes of a chromatic scale, and having between said circumferential series and the other end chord composing note designations representing selected notes of a plurality of chromatic scales arranged in a plurality of longitudinal series respectively in longitudinal line with said key signature designations, and with the note designations of said plurality of longitudinal series circumferentially aligned to provide a plurality of circumferential series of chromatic scales, said longitudinal series and said circumferential series each having their note designations arranged in predetermined staggered relation, the first note designation of each longitudinal series corresponding to the longitudinally aligned key signature note designation, and second and third elements each comprising a cylindrical tubular member, said second element being disposed in surrounding relation to said first element for rotation relative thereto, and said third element being disposed in surrounding relation to said second element for rotation relative to said first and second elements, one of said second and third elements having a sight opening for register with a selected key signature designation of said first element and a second sight opening in longitudinal line with said first sight opening and coextensive with the longitudinal series of chord composing note designations in longitudinal line with said selected key signature designations in register with said first sight opening, and the other of said second and third elements having a circumferential series of chord designations for selective longitudinal alignment with said sight openings of said one element, and means in longitudinal line with each of said chord designations and coextensive with said second sight opening for exposing the first note designation and additional predetermined chord composing note designations of said longitudinal series in line with said selected key signature designation in register with said first sight opening and concealing the remaining note designations thereof.

2. In a music transposition and chord construction device, a first element comprising a cylindrical member having adjacent one end a circumferential series of key signature note designations representing selected notes of a chromatic scale, and having between said circumferential series and the other end chord composing note designations representing selected notes of a plurality of chromatic scales arranged in a plurality of longitudinal series respectively in longitudinal line with said key signature designations, and with the note designations of said plurality of longitudinal series circumferentially aligned to provide a plurality of circumferential series of chromatic scales, said longitudinal series and said circumferential series each having their note designations arranged in predetermined staggered relation, the first note designation of each longitudinal series corresponding to the longitudinally aligned key signature note designation, and second and third elements each comprising a cylindrical tubular member, said second element being disposed in surrounding relation to said first element for rotation relative thereto, and said third element being disposed in surrounding relation to the said second element for rotation relative to said first and second elements, said third element having a sight opening for register with a selected key signature designation of said first element and a second sight opening in longitudinal line with said first sight opening and coextensive with the longitudinal series of chord composing note designations in longitudinal line with said selected key signature designation in register with said first sight opening, and said second element having a circumferential series of chord designations for selective longitudinal alignment with said sight openings of said third element, and means in longitudinal line with each of said chord designations and coextensive with said second sight opening for exposing the first note designation and additional predetermined chord composing note designations of said longitudinal series in line with said selected key signature designation in register with said first sight opening and concealing the remaining note designations thereof.

3. The invention as defined in claim 2, further characterized in that said third element has a third sight opening in longitudinal line with said first and second sight openings for register with a selected chord designation of said second element.

4. In a music transposition and chord construction device, a first element comprising a cylindrical member having adjacent one end a circumferential series of key signature note designations representing selected notes of a chromatic scale, and having between said circumferential series and the other end chord composing note designations representing selected notes of a plurality of chromatic scales arranged in a plurality of longitudinal series respectively in longitudinal line with said key signature designations, and with the note designations of said plurality of longitudinal series circumferentially aligned to provide a plurality of circumferential series of chromatic scales, said longitudinal series and said circumferential series each having their note designations arranged in predetermined staggered relation, the first note designation of each longitudinal series corresponding to the longitudinally aligned key signature note designation, and second and third elements each comprising a cylindrical tubular member, said second element being disposed in surrounding relation to said first element for rotation relative thereto, and said third element being disposed in surrounding relation to said second element for rotation relative to said first and second elements, said second element having a sight opening for register with a selected key signature designation of said first element and a second sight opening in longitudinal line with said first sight opening and coextensive with the longitudinal series of chord composing note designations in longitudinal line with said selected key signature designation in register with said first sight opening, and said third element having a circumferential series of chord designations for selective longitudinal alignment with said sight openings of said second element, and means in longitudinal line with each of said chord designations and coextensive with said second sight opening for exposing the first note designation and additional predetermined chord composing note designations of said longitudinal series in line with said selected key signature designation in register with said first sight opening and concealing the remaining note designations thereof.

References Cited in the file of this patent

UNITED STATES PATENTS

| | | |
|---|---|---|
| 731,175 | Goodman | June 16, 1903 |
| 1,041,204 | Van Rensselaer | Oct. 15, 1912 |
| 2,262,818 | Reese | Nov. 18, 1941 |
| 2,542,235 | Clopton | Feb. 20, 1951 |